(12) United States Patent
Kimura et al.

(10) Patent No.: US 12,055,507 B2
(45) Date of Patent: Aug. 6, 2024

(54) MEMS GAS SENSOR AND METHOD FOR MANUFACTURING MEMS GAS SENSOR

(71) Applicant: NISSHA CO., LTD., Kyoto (JP)

(72) Inventors: Teppei Kimura, Kyoto (JP); Hiroaki Suzuki, Kyoto (JP); Kazuo Terasawa, Kyoto (JP)

(73) Assignee: NISSHA CO., LTD., Kyoto (JP)

( * ) Notice: Subject to any disclaimer, the term of this patent is extended or adjusted under 35 U.S.C. 154(b) by 709 days.

(21) Appl. No.: 17/285,027

(22) PCT Filed: Aug. 28, 2019

(86) PCT No.: PCT/JP2019/033636
§ 371 (c)(1),
(2) Date: Nov. 2, 2021

(87) PCT Pub. No.: WO2020/079966
PCT Pub. Date: Apr. 23, 2020

(65) Prior Publication Data
US 2022/0221416 A1   Jul. 14, 2022

(30) Foreign Application Priority Data
Oct. 15, 2018 (JP) .............................. 2018-194094

(51) Int. Cl.
*G01N 27/12* (2006.01)
*H05B 3/28* (2006.01)

(52) U.S. Cl.
CPC ......... *G01N 27/123* (2013.01); *G01N 27/128* (2013.01); *H05B 3/28* (2013.01)

(58) Field of Classification Search
CPC ....... G01N 27/123; G01N 27/128; H05B 3/28
USPC ...... 324/691, 693, 697, 698; 338/34, 35, 44; 73/23, 31.05, 31.06, 863.12
See application file for complete search history.

(56) References Cited

U.S. PATENT DOCUMENTS

| | | | |
|---|---|---|---|
| 2002/0142478 A1* | 10/2002 | Wado | G01N 27/124 436/151 |
| 2015/0125679 A1 | 5/2015 | Ishikawa | |

(Continued)

FOREIGN PATENT DOCUMENTS

| | | |
|---|---|---|
| EP | 1953539 A1 | 8/2008 |
| JP | S63159744 A | 7/1988 |
| JP | H0666611 A | 3/1994 |

(Continued)

*Primary Examiner* — Robert R Raevis
(74) *Attorney, Agent, or Firm* — Alleman Hall & Tuttle LLP

(57) ABSTRACT

To extend the life of a MEMS gas sensor, the MEMS gas sensor includes an insulator, a gas sensitive material, a first oxide film and an interlayer insulating film, a heater wiring pattern, a lower protective film, and an upper protective film. The insulator includes a cavity. The gas sensitive material is provided corresponding to the cavity. The first oxide film and the interlayer insulating film are provided on the insulator and arranged to overlap each other in a plan view. The heater wiring pattern serves to heat the gas sensitive material and is disposed between the first oxide film and the interlayer insulating film. The lower protective film and the upper protective film cover, in direct contact, an upper surface, a lower surface, and a side surface of the heater wiring pattern.

20 Claims, 15 Drawing Sheets

(56) References Cited

U.S. PATENT DOCUMENTS

2016/0370336 A1  12/2016  Ahn et al.
2018/0045664 A1   2/2018  Ahn et al.

FOREIGN PATENT DOCUMENTS

| JP | 2001235442 A |   | 8/2001  |
|----|--------------|---|---------|
| JP | 2006337110 A | * | 12/2006 |
| JP | 4033575 B2   | * | 1/2008  |
| JP | 2008275603 A |   | 11/2008 |
| JP | 2012098232 A |   | 5/2012  |
| JP | 2012098234 A |   | 5/2012  |
| JP | 2014025869 A |   | 2/2014  |
| JP | 2016050824 A |   | 4/2016  |
| KR | 20170053968 A | * | 5/2017 |
| WO | 2017014033 A1 |  | 1/2017  |

* cited by examiner

CROSS-SECTIONAL SEM PHOTOGRAPH OF HEATER UNIT

MEMS GAS SENSOR AND METHOD FOR MANUFACTURING MEMS GAS SENSOR

CROSS REFERENCES TO RELATED APPLICATIONS

This application is a national phase of International Application No. PCT/JP2019/033636, filed on Aug. 28, 2019, which claims priority to Japanese Patent Application No. 2018-194094, filed on Oct. 15, 2018, each of which is incorporated herein by reference for all purposes.

TECHNICAL FIELD

The present disclosure relates to a gas sensor, in particular, a MEMS gas sensor and a method for manufacturing the same.

BACKGROUND

A gas sensitive material of a semiconductor type gas sensor is made of a metal oxide semiconductor (such as tin oxide). When reducing gas contacts high-temperature tin oxide, oxygen on the surface reacts with the reducing gas and is removed. As a result, electrons in the tin oxide become free (i.e., the resistance of the tin oxide decreases). Gas is detected in the semiconductor type gas sensor in accordance with the principles described above.

A MEMS (Micro Electro Mechanical Systems) gas sensor that is a type of semiconductor type gas sensor mainly includes a semiconductor chip and a package containing the semiconductor chip.

A cavity is formed in the semiconductor chip. An insulating film is formed in an opening of the cavity, and a gas sensitive portion is provided on the insulating film. The gas sensitive portion includes a gas sensitive material and a thin film heater. The gas sensitive portion further includes wiring. The wiring is drawn from the gas sensitive material and the thin film heater to the outside of the cavity and is connected to an electrode pad (see, for example, Patent Document 1).

CITATION LIST

Patent Literature

Patent Document 1: JP2012-98234A

SUMMARY OF PROBLEMS TO BE SOLVED BY THE PRESENT DISCLOSURE

In general, Pt is used in a heater layer of the MEMS gas sensor. However, since the life of the Pt heater is short, a NiCr heater has been considered.

In the development of the NiCr heater, the inventors have investigated the use of a SiN film as an interlayer insulating film. However, since the deposition rate of the SiN film is low, productivity is low.

Therefore, the inventors have investigated the use of a $SiO_2$ film as the interlayer insulating film in order to increase the deposition rate. However, it has been revealed that in a life test of the heater, a change in a resistance value of the $SiO_2$ film is large and thus the lifespan is short.

An object of the present disclosure is to extend the life of a MEMS gas sensor.

FEATURES FOR SOLVING THE PROBLEMS

Some aspects will be described below as means to solve the problems. These aspects can be combined arbitrarily as necessary.

A MEMS gas sensor according to one aspect of the present disclosure includes an insulator, a gas sensitive material, a first protective film and a second protective film, heater wiring, and a gas barrier layer.

The insulator includes a cavity.

The gas sensitive material is provided corresponding to the cavity.

The first protective film and the second protective film are provided on the insulator and are disposed to overlap in a plan view.

The heater wiring serves to heat the gas sensitive material and is disposed between the first protective film and the second protective film.

The gas barrier layer covers, in direct contact, both surfaces and a side surface of the heater wiring.

In this sensor, both the surfaces and the side surface of the heater wiring are covered by the gas barrier layer, and thus a change in a resistance value of a heater can be reduced. Therefore, the life can be increased. The reason for this is that, even when gas barrier properties of the first protective film and the second protective film are low or even when gas components such as hydrogen or oxygen inside the first protective film and the second protective film move to the outside, the gas barrier layer restricts the movement of gas and thus the heater wiring is not influenced by the gas.

At least a portion of the side surface of the heater wiring may extend obliquely in a side view.

In this sensor, the side surface of the heater wiring is inclined, and thus it is easier to form the gas barrier layer on the side surface of the heater wiring. Therefore, the adhesion of the gas barrier layer increases.

The first protective film and the second protective film may be made of $SiO_2$.

In this sensor, the deposition rates of the first protective film and the second protective film are increased, and a thick film can be easily formed.

The heater wiring may be made of NiCr.

In this sensor, the lifespan of the heater is extended.

The gas barrier layer may be a metal oxide film.

In this sensor, the gas barrier layer can be formed by sputter deposition, and the gas barrier layer has an insulating property or a resistance value significantly high compared with that of the heater wiring.

The gas barrier layer may be made of $Ta_2O_5$.

In this sensor, the adhesion of the gas barrier layer is high.

The heater wiring may be formed in an annular shape in a plan view at a location corresponding to the gas sensitive material.

In this sensor, the center portion of the heater is not formed. Therefore, the difference in temperature between the center side and the outer circumferential side of the heater is reduced. As a result, the heater lifespan is extended, and sensor characteristics also become stable.

Conventionally, the patterns are densely disposed in the center portion of the heater; therefore, the temperature of the center portion rises. Consequently, the temperature distribution is deteriorated.

A method for manufacturing a MEMS gas sensor according to another aspect of the present disclosure includes the following steps. Note that the order of execution of the steps is not particularly limited.

Forming a first protective film on an insulator including a cavity.

Forming a first gas barrier layer on the first protective film.

Forming heater wiring on the first gas barrier layer, the heater wiring being configured to heat a gas sensitive material.

Forming a second gas barrier layer configured to cover an upper surface and a side surface of the heater wiring.

Forming a second protective film to sandwich the heater wiring between the first protective film and the second protective film.

Forming the gas sensitive material to be provided corresponding to the cavity of the insulator.

In this method, both the surfaces and the side surface of the heater wiring are covered by the first and second gas barrier layers, and thus a change in a resistance value of the heater can be reduced. Therefore, the life can be increased. The reason for this is that, even when gas barrier properties of the first protective film and the second protective film are low or even when gas components such as hydrogen or oxygen inside the first protective film and the second protective film move to the outside, the first and second gas barrier layers restrict the movement of gas and thus the heater wiring is not influenced by the gas.

The method for manufacturing a MEMS gas sensor may further include the following steps.

Processing at least a portion of the side surface of the heater wiring such that the at least a portion of the side surface extends obliquely in a side view.

In this method, the side surface of the heater wiring is inclined, and thus it is easier to form the second gas barrier layer on the side surface of the heater wiring. Therefore, the adhesion of the second gas barrier layer increases.

ADVANTAGEOUS EFFECTS OF DISCLOSURE

A MEMS gas sensor according to the present disclosure results in a longer lifespan.

DETAILED DESCRIPTION

1. First Embodiment (1) MEMS Gas Sensor

Figure 1:
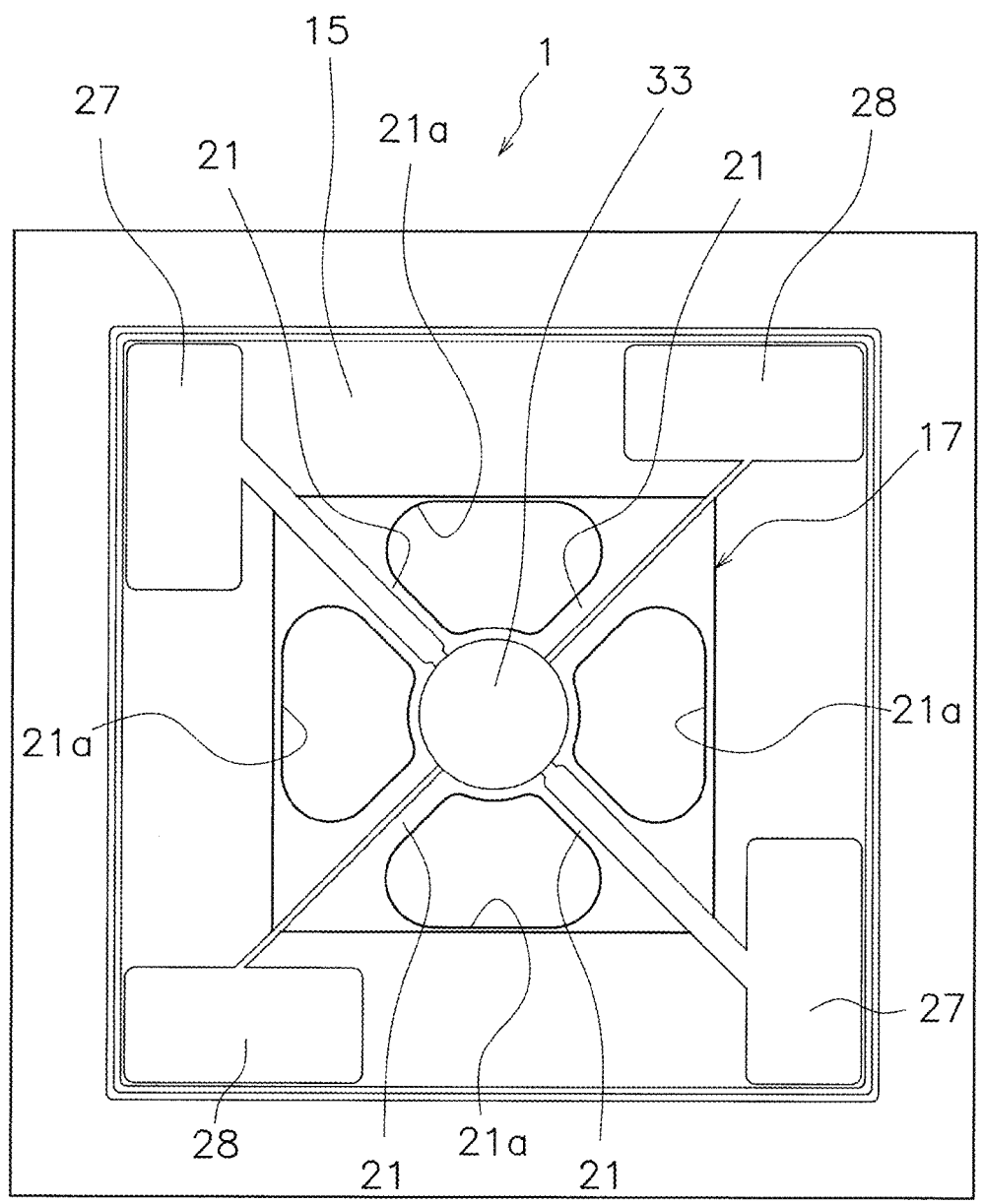
FIG. 1 is a plan view of a MEMS gas sensor as a first embodiment of the present disclosure.
Figure 2:
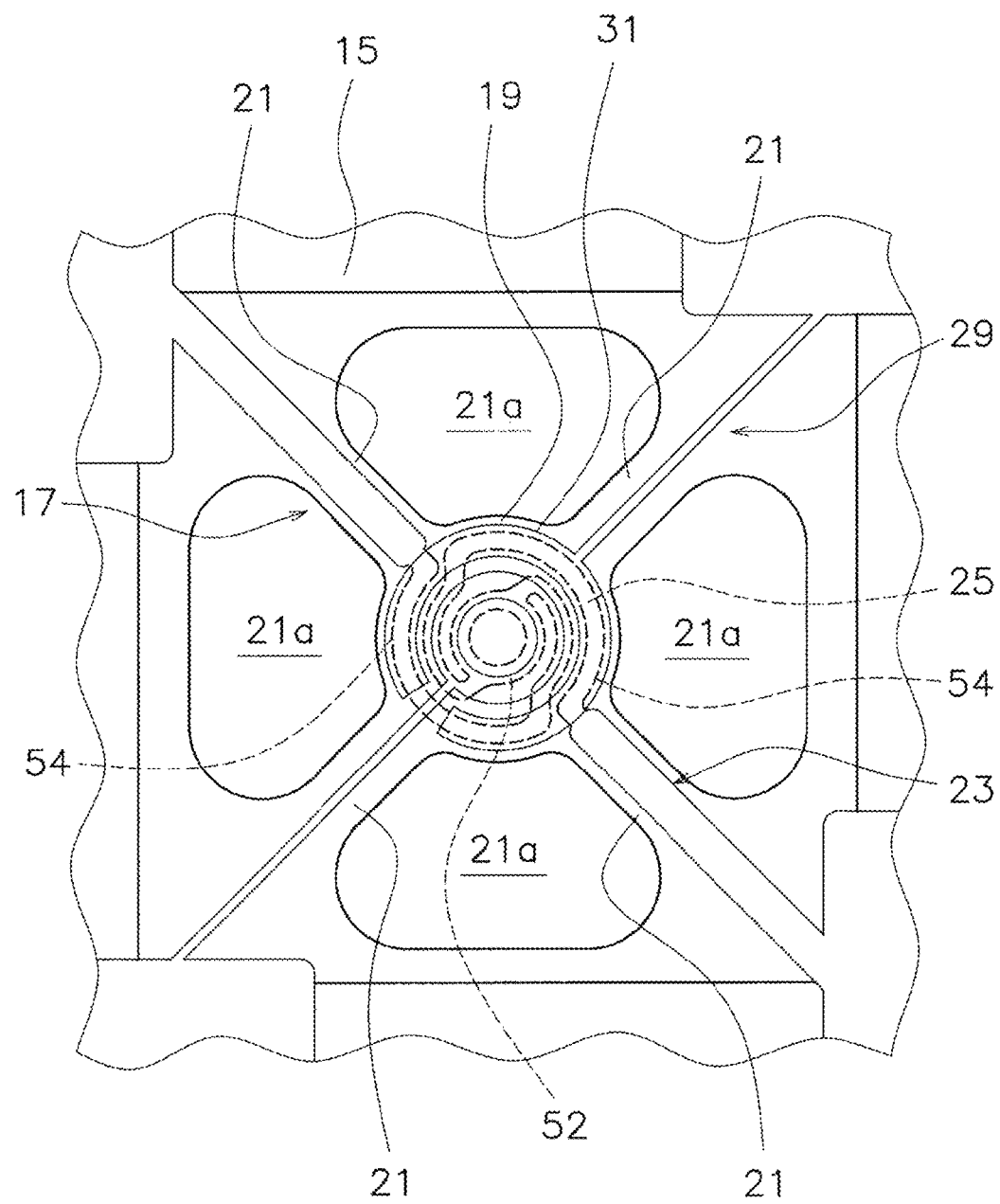
FIG. 2 is a plan view of a transverse cross-section in a portion of the MEMS gas sensor.
Figure 3:
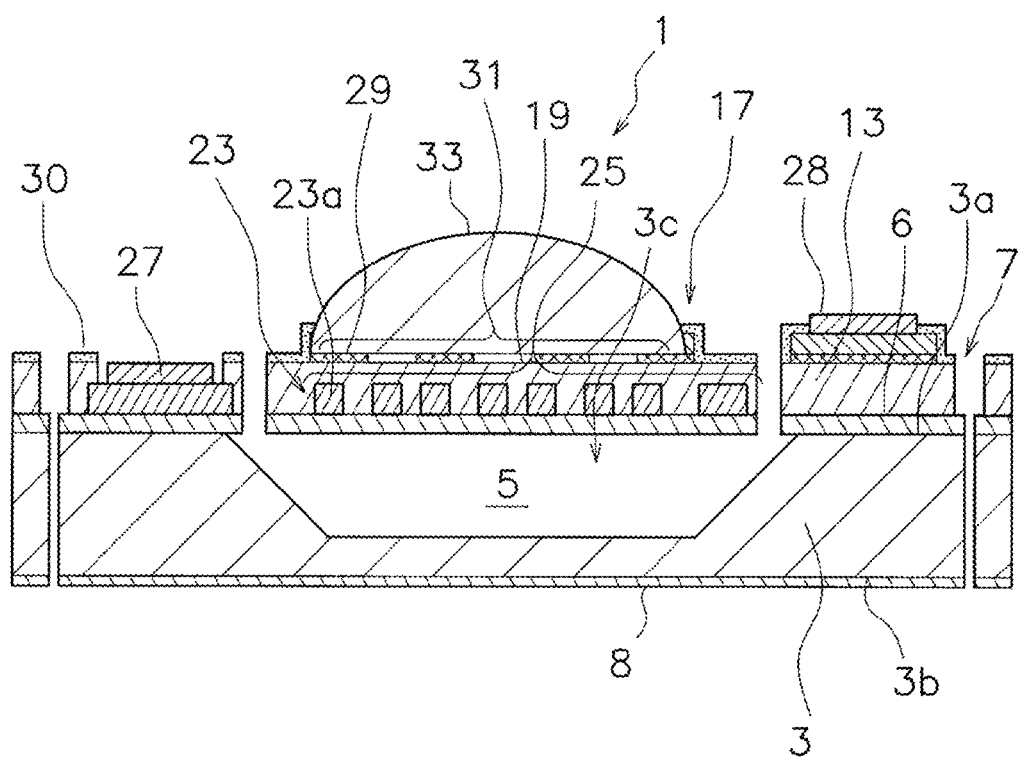
FIG. 3 is a schematic cross-sectional view of the MEMS gas sensor.

Using FIGS. 1 to 3, a MEMS gas sensor 1 (hereinafter referred to as a gas sensor 1) as an embodiment of the present disclosure will be described. FIG. 1 is a plan view of a MEMS gas sensor as a first embodiment of the present disclosure. FIG. 2 is a plan view of a transverse cross-section in a portion of the MEMS gas sensor. FIG. 3 is a schematic cross-sectional view of the MEMS gas sensor.

As illustrated in FIG. 3, the gas sensor 1 includes a base 3 (an example of an insulator). The base 3 includes a first main surface 3a and a second main surface 3b that face each other in a thickness direction. The material of the base 3 is, for example, silicon, sapphire glass, quartz glass, ceramic wafer, or SiC. The thickness of the base 3 is 100 to 800 μm.

The base 3 includes a cavity 3c (an example of a cavity). The cavity 3c includes an opening 5 opened to the first main surface 3a. The depth of the cavity 3c is 100 to 800 μm. The cavity 3c has a quadrangular pyramid shape having a transverse cross-sectional area that increases from the bottom to the opening. Note that the shape of the cavity may be a vertical hole and that the planar shape may be a square, a rectangle, or a circle.

In addition, a first oxide film 6 (an example of a first protective film) is formed on the first main surface 3a of the base 3. A second oxide film 8 is formed on the second main surface 3b of the base 3. The thickness of each of the first oxide film 6 and the second oxide film 8 is from 0.05 to 2 μm.

The gas sensor 1 includes a base insulating layer 7. The base insulating layer 7 is formed on the first main surface 3a of the base 3. The base insulating layer 7 includes an interlayer insulating film 13 (an example of a second protective film). As described above, the interlayer insulating film 13 is disposed as the base insulating layer 7 so as to overlap with the first oxide film 6 in a plan view.

The thickness of the interlayer insulating film 13 is 1 to 5 μm.

The material of the interlayer insulating film 13 is, for example, $SiO_2$, SiON, SiOC, or SiOCN. As an example, when the interlayer insulating film 13 is made of $SiO_2$, the deposition rate of the interlayer insulating film 13 is increased, and a thick film can be easily formed.

As illustrated in FIG. 2, the base insulating layer 7 includes a fixing portion 15 fixed to the first main surface 3a of the base 3, and a thin plate-shaped bridge portion 17 integrally provided with the fixing portion 15 and positioned corresponding to the opening 5 of the base 3. The bridge portion 17 is a thin film-shaped support film formed on the base 3 so as to close the opening 5 of the cavity 3c. As illustrated in FIG. 2, the bridge portion 17 includes a central portion 19 and four connecting portions 21 connecting the central portion 19 and the fixing portion 15. Cutouts 21a are formed between the connecting portions 21. The cutouts 21a are portions allowing the opening 5 of the cavity 3c to connect to the outside. In the present embodiment, as illustrated in FIG. 2, the bridge shape of the four connecting portions 21 is generally an X shape and is exactly a type of four cross rounded corners. This is preferable from push strength and temperature distribution results.

The number of connecting portions is, for example, two to five connecting portions, and the connecting portions are formed in an equilateral cross with arms bent at right angles shape, an X shape, a plus shape, or the like. In addition, instead of the bridge portion, the thin plate-shaped portion may be a membrane portion that has no cutout.

As illustrated in FIGS. 2 and 3, the gas sensor 1 includes a heater wiring pattern 23 (an example of heater wiring). The heater wiring pattern 23 serves to heat a gas sensitive material 33 (described below). The heater wiring pattern 23 is disposed between the first oxide film 6 and the interlayer insulating film 13.

As illustrated in FIG. 3, the layer structure of the heater wiring pattern 23 includes a heater layer 23a. The thickness of the heater layer 23a is 0.1 to 1 μm. The material of the heater layer 23a is, for example, NiCr, Pt, Mo, Ta, W, NiCrFe, NiCrFeMo, NiCrAl, FeCrAl, or NiFeCrNbMo. As an example, when the heater layer 23a is made of NiCr, the lifespan of a heater is extended.

Note that when the heater layer 23a is made of a material other than NiCr, a heater layer bonding film may be provided. The material of the heater layer bonding film is, for example, Ti, Ta, $Ta_2O_5$, or $Al_2O_3$. The thickness of the heater layer bonding film is from 0.01 to 0.5 μm.

Figure 4:
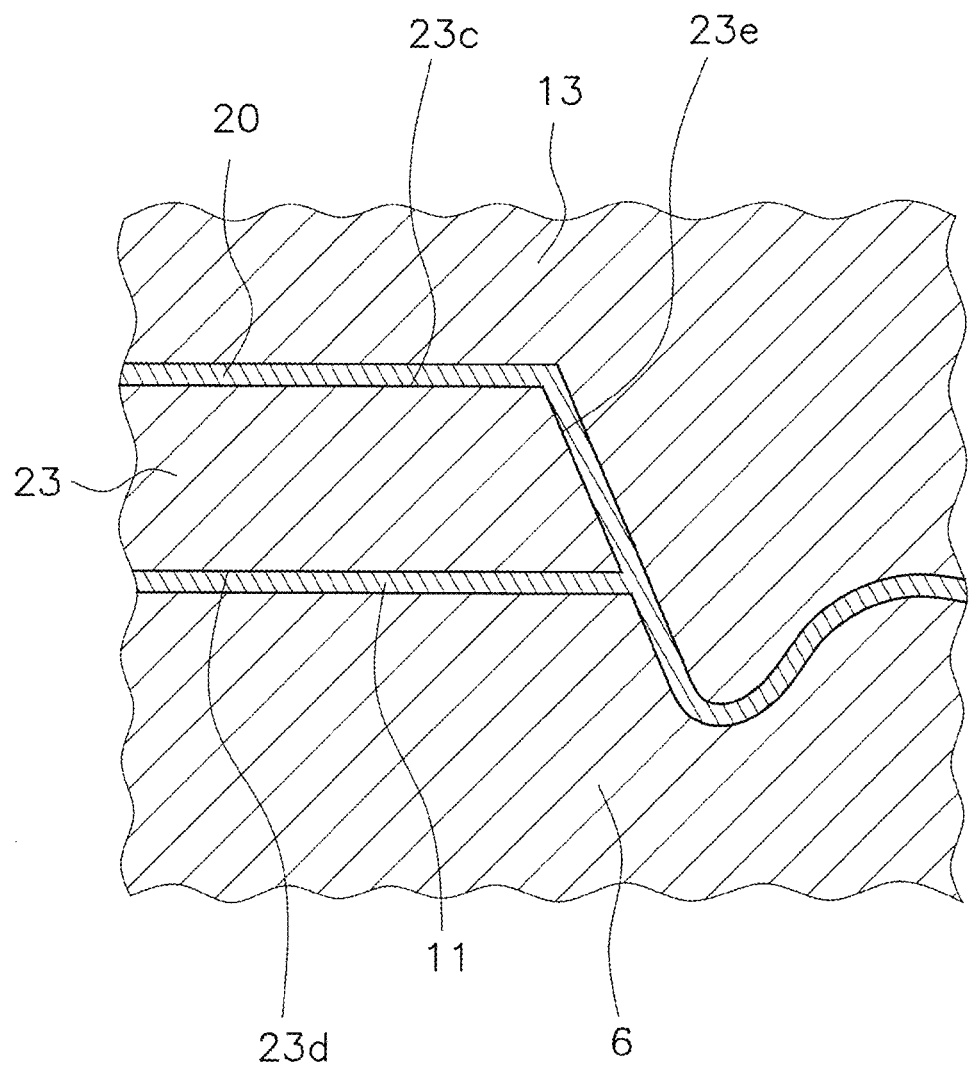
FIG. 4 is a cross-sectional view of heater wiring of the MEMS gas sensor.
Figure 5:
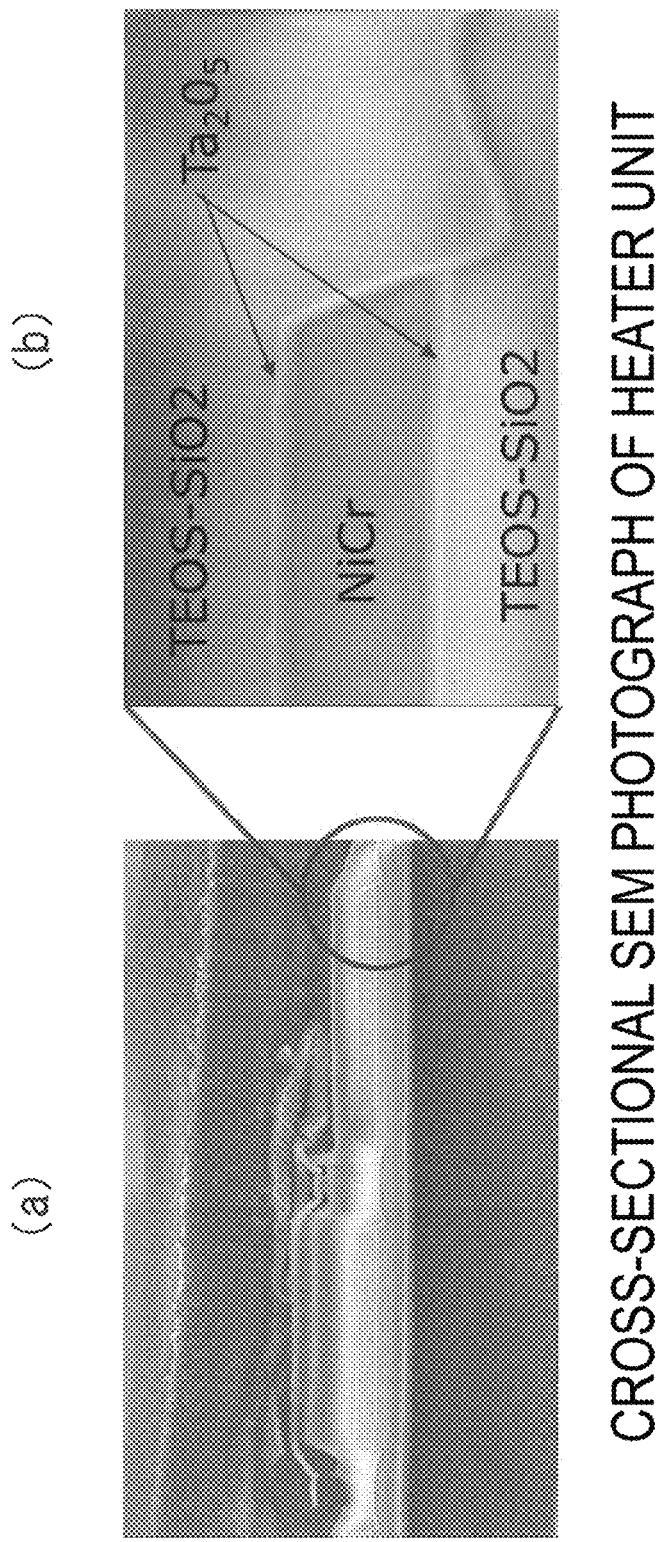
FIG. 5 is a cross-sectional photograph of the heater wiring of the MEMS gas sensor.

As illustrated in FIGS. 4 and 5, the heater wiring pattern 23 is covered by a lower protective film 11 (an example of a gas barrier layer, a first gas barrier layer) and an upper protective film 20 (an example of a gas barrier layer, a second gas barrier layer). FIG. 4 is a cross-sectional view of heater wiring of the MEMS gas sensor. FIG. 5 is a cross-sectional photograph of the heater wiring of the MEMS gas sensor. The heater wiring pattern 23 includes an upper surface 23c, a lower surface 23d, and a side surface 23e. The lower surface 23d is covered by the lower protective film 11, and the upper surface 23c and the side surface 23e are covered by the upper protective film 20.

NiCr in FIG. 5(b) corresponds to the heater wiring pattern 23, TEOS-$SiO_2$ corresponds to the first oxide film 6 and the interlayer insulating film 13, and $Ta_2O_5$ corresponds to the lower protective film 11 and the upper protective film 20.

The lower protective film 11 and the upper protective film 20 are made of, for example, $Ta_2O_5$, $Al_2O_3$, SiN, SiO, SiC, SiCN, TiN, TiC, $TiB_2$, $Cr_2O_3$, $HfO_2$, $Nb_2O_5$, $ZrO_2$, CrN, or AlN. The thickness of the lower protective film 11 and the upper protective film 20 ranges from 0.05 to 0.20 μm.

The entire surface of the heater wiring pattern 23 is covered by the upper protective film 20 and the lower protective film 11 which are gas barrier layers, and thus a change in a resistance value of the heater wiring pattern 23 can be reduced. Therefore, the life can be increased. This is because, even when gas barrier properties of the first oxide film 6 and the interlayer insulating film 13 are low or even when gas components such as hydrogen or oxygen inside the first oxide film 6 and the interlayer insulating film 13 move to the outside, the upper protective film 20 and the lower protective film 11 which are gas barrier layers restrict the movement of gas and thus the heater wiring pattern 23 is not influenced by the gas.

The side surface 23e extends obliquely in a side view, that is, is an inclined surface. Accordingly, the upper protective film 20 is easily formed at the side surface 23e of the heater wiring pattern 23, and thus the adhesion of the upper protective film 20 is increased. Note that the inclination angle of the side surface 23e is, for example, 30 to 80 degrees.

When the upper protective film 20 is made of, for example, a metal oxide film, the upper protective film 20 can be formed by sputter deposition, and the upper protective film 20 has an insulating property or a resistance value significantly high compared with that of the heater wiring pattern 23.

The upper protective film 20 is preferably made mainly of $Ta_2O_5$. In this case, the adhesion of the upper protective film 20 to the heater wiring pattern 23 is high.

As illustrated in FIGS. 1 to 3, the heater wiring pattern 23 includes an electric heater unit 25 in the central portion 19 of the bridge portion 17. The electric heater unit 25 is connected to a pair of heater electrode pads 27, 27. The electric heater unit 25 serves to heat the gas sensitive material 33 (described below) and functions to facilitate reaction of the measurement gas and the gas sensitive material 33 and to rapidly diffuse the absorbed gas and moisture after the reaction.

The electric heater unit 25 corresponds to the center of the central portion 19 of the bridge portion 17 and includes an annular portion 52. Specifically, the annular portion 52 is configured such that connecting portions 54 (described below) respectively branch at the central portion to be connected in an annular shape. As just described, the center portion of the electric heater unit 25 is not formed. Therefore, the difference in temperature between the center side and the outer circumferential side of the electric heater unit 25 is reduced. As a result, the heater lifespan is extended, and sensor characteristics also become stable.

The electric heater unit 25 includes the connecting portions 54 extending circumferentially about 270 degrees in the central portion 19 of the bridge portion 17. One end of each connecting portion 54 is connected to the annular portion 52.

The gas sensor 1 includes an electrode wiring pattern 29. The layer structure of the electrode wiring pattern 29 includes a sense layer 29a and a sense layer bonding film 29b (see FIG. 20). The thickness of the sense layer 29a is 0.1 to 1 μm. The thickness of the sense layer bonding film 29b is 0.01 to 0.5 μm. The material of the sense layer 29a is, for example, Pt, W, or Ti. The material of the sense layer bonding film 29b is, for example, Ti, Ta, $Ta_2O_5$, or $Al_2O_3$.

As illustrated in FIGS. 2 and 3, the electrode wiring pattern 29 configures a detection electrode portion 31 in the central portion 19 of the bridge portion 17. The detection electrode portion 31 is formed on the surface of the interlayer insulating film 13. The detection electrode portion 31 is connected to a pair of detection electrode pads 28, 28. The detection electrode portion 31 functions to detect a change in a resistance value within the gas sensor 1 when gas to be detected adheres to the gas sensitive material 33 (described below).

The gas sensor 1 includes the gas sensitive material 33. The gas sensitive material 33 includes a property sensitive (reacting) to gas to be measured. Specifically, a resistance value of the gas sensitive material 33 changes in accordance with a change in concentration of the gas to be measured. The gas sensitive material 33 is formed on the central portion 19 of the bridge portion 17 so as to cover the detection electrode portion 31. In other words, the gas sensitive material 33 is provided corresponding to the cavity 3c.

The thickness of the gas sensitive material 33 is 3 to 50 μm. The material of the gas sensitive material 33 is, for example, $SnO_2$, $WO_3$, $ZnO$, $NiO$, $CuO$, $FeO$, or $In_2O_3$. A method for forming the gas sensitive material 33 is, for example, screen printing, dispenser application, ink jet application, or sputtering.

In addition, a surface protective film 30 is formed on the surface of the base insulating layer 7. The surface protective film 30 is made of a known material.

(2) Method for Manufacturing Gas Sensor

A method for manufacturing the gas sensor 1 will be described with use of FIGS. 6 to 20. FIGS. 6 to 20 are cross-sectional views illustrating a manufacturing process of the MEMS gas sensor. Note that even during the manufacturing process, the same reference signs may be assigned to components corresponding to components of a finished product.

Figure 6:
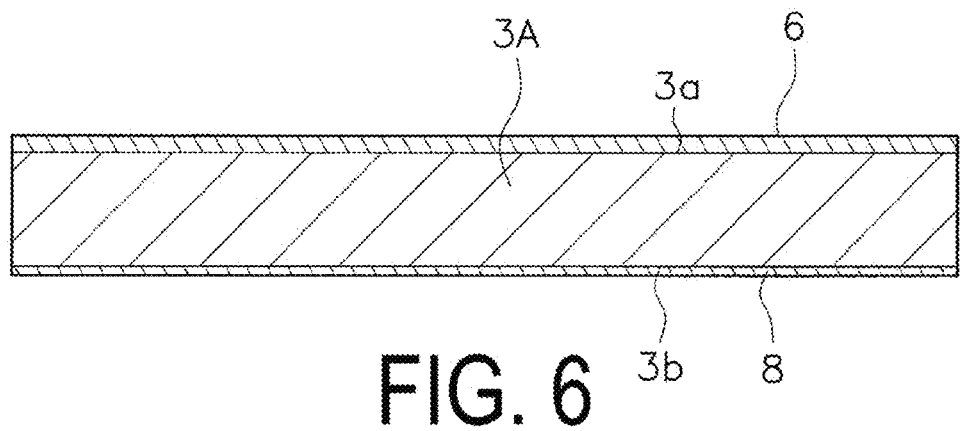
FIG. 6 is a cross-sectional view illustrating a manufacturing process of the MEMS gas sensor.

As illustrated in FIG. 6, a large area wafer 3A made of, for example, a silicon single crystal substrate, is loaded as a material of the base 3. The wafer 3A includes the first main surface 3a and the second main surface 3b.

Furthermore, the first oxide film 6 and the second oxide film 8 are respectively formed on the first main surface 3a and the second main surface 3b of the wafer 3A. The oxide film is formed by, for example, a thermal oxidation method.

Next, steps of forming the heater wiring pattern 23 on the wafer 3A will be described with use of FIGS. 7 to 9.

Figure 7:
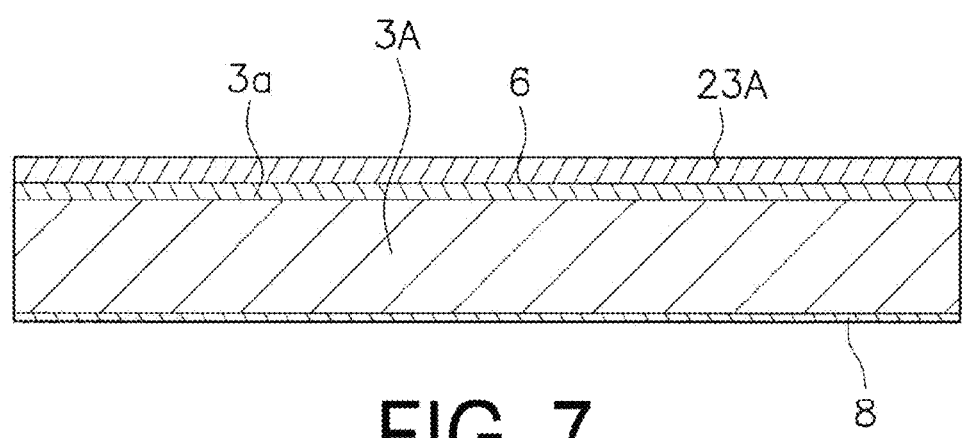
FIG. 7 is a cross-sectional view illustrating a manufacturing process of the MEMS gas sensor.

In FIG. 7, the lower protective film 11 is further formed by sputtering. However, in FIG. 7, the lower protective film 11 is not illustrated.

Furthermore, in FIG. 7, a heater solid layer 23A is formed on the lower protective film 11.

Figure 8:
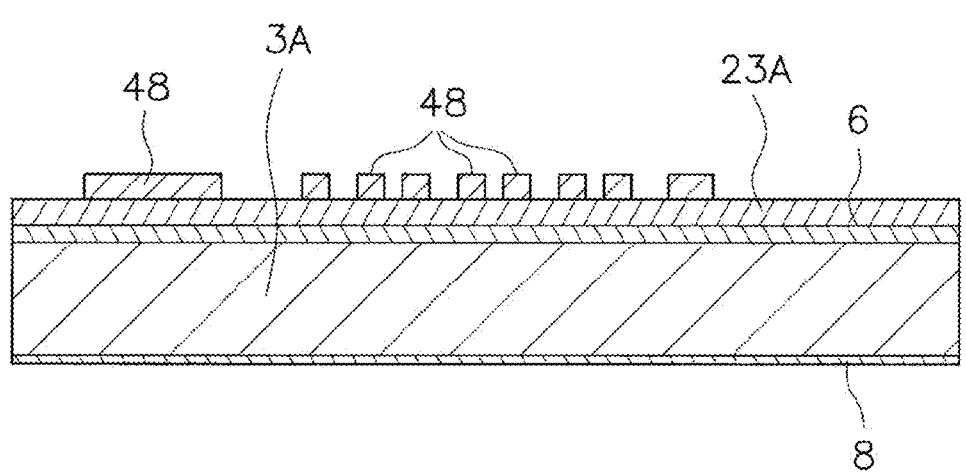
FIG. 8 is a cross-sectional view illustrating a manufacturing process of the MEMS gas sensor.

As illustrated in FIG. 8, a resist 48 in a predetermined pattern is formed on the heater solid layer 23A. The predetermined pattern is formed by resist coating, exposure, and development processes.

Figure 9:
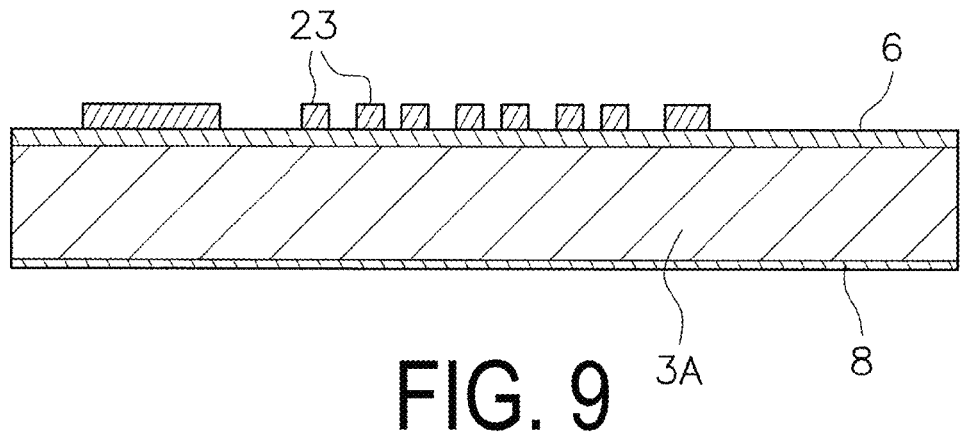
FIG. 9 is a cross-sectional view illustrating a manufacturing process of the MEMS gas sensor.

As illustrated in FIG. 9, the heater solid layer 23A is dry-etched. Further, the resist 48 is removed. As a result, the heater wiring pattern 23 is obtained.

Figure 21:
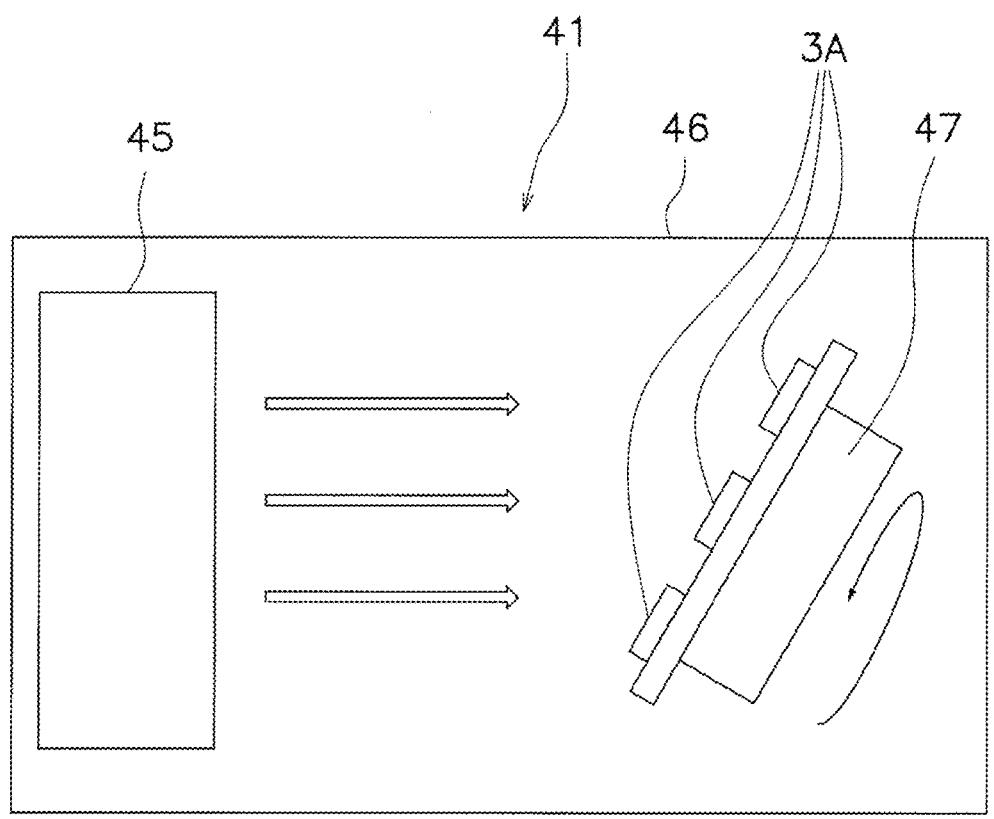
FIG. 21 is a schematic view illustrating the principles of milling with Ar ions.

Next, as illustrated in FIG. 21, an ion milling device 41 is used to process the side surface 23e of the heater wiring pattern 23 into an inclined surface shape. FIG. 21 is a schematic diagram illustrating the principles of milling with Ar ions.

The ion milling device 41 is a device that performs etching by irradiating a surface of an object with a weak argon ion beam. The ion milling device 41 includes a chamber 46, an Ar ion source 45, and a wafer holding unit 47. The Ar ion source 45 and the wafer holding unit 47 are disposed in the chamber 46. The wafer holding unit 47 is provided to face the Ar ion source 45 and carries a plurality of the wafers 3A. The wafer holding unit 47 rotates while being tilted with respect to an irradiation direction of the Ar ions.

As a result, as illustrated in FIG. 4, the side surface 23e of the heater wiring pattern 23 is formed into an inclined surface.

Further, the upper protective film 20 is formed on the heater wiring pattern 23 by sputtering. However, in FIG. 9, the upper protective film 20 is not illustrated.

As illustrated in FIG. 4, the upper protective film 20 is formed on the upper surface 23c and the side surface 23e of the heater wiring pattern 23. At this time, since the side surface 23e is an inclined surface, the adhesion of the upper protective film 20 is favorable.

Hereinafter, steps of forming the electrode wiring pattern 29 on the wafer 3A will be described with use of FIGS. 10 to 12.

Figure 10:
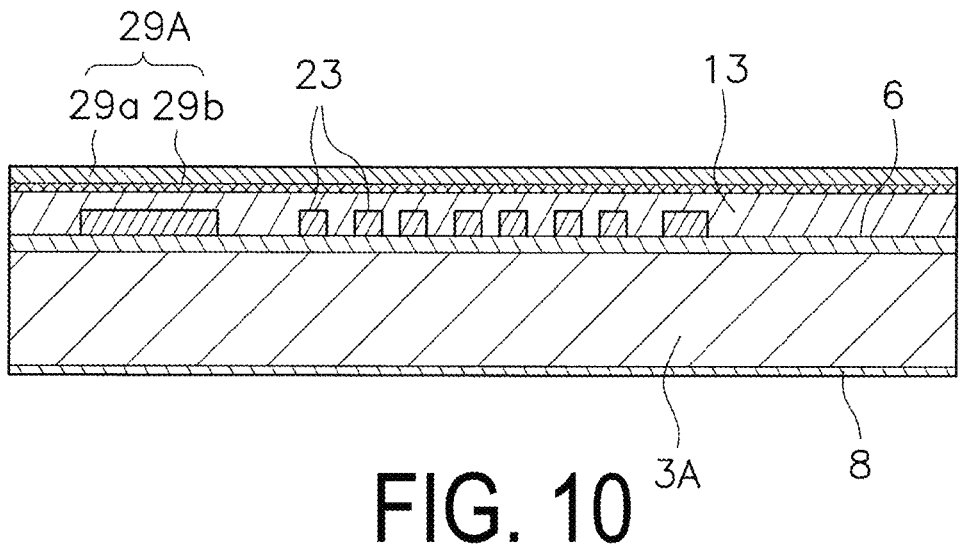
FIG. 10 is a cross-sectional view illustrating a manufacturing process of the MEMS gas sensor.

As illustrated in FIG. 10, the interlayer insulating film 13 is formed on the heater wiring pattern 23 by TEOS.

Furthermore, an electrode wiring solid layer 29A is formed on the interlayer insulating film 13.

Figure 11:
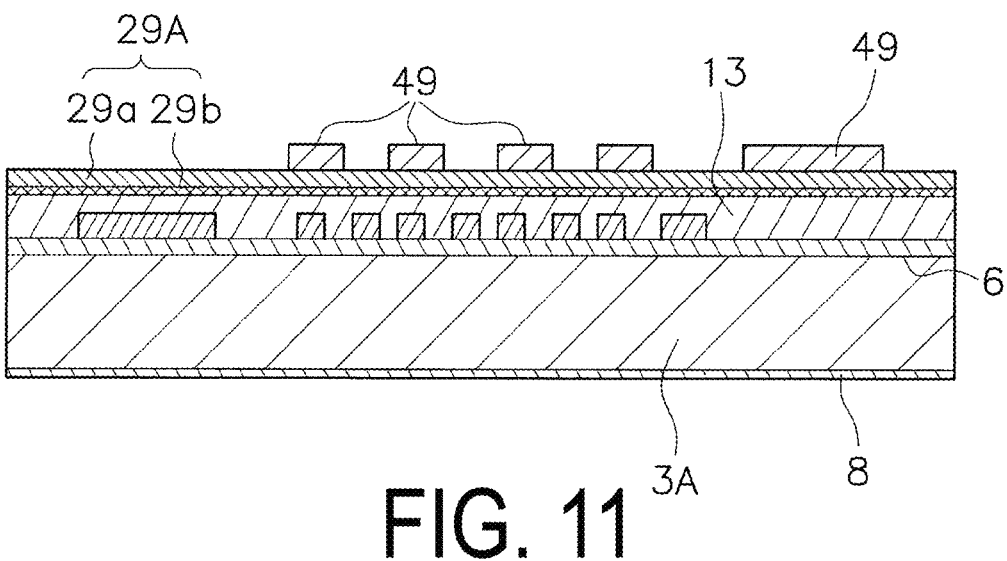
FIG. 11 is a cross-sectional view illustrating a manufacturing process of the MEMS gas sensor.

As illustrated in FIG. 11, a resist 49 in a predetermined pattern is formed on the electrode wiring solid layer 29A. The predetermined pattern is formed by resist coating, exposure, and development processes.

Figure 12:
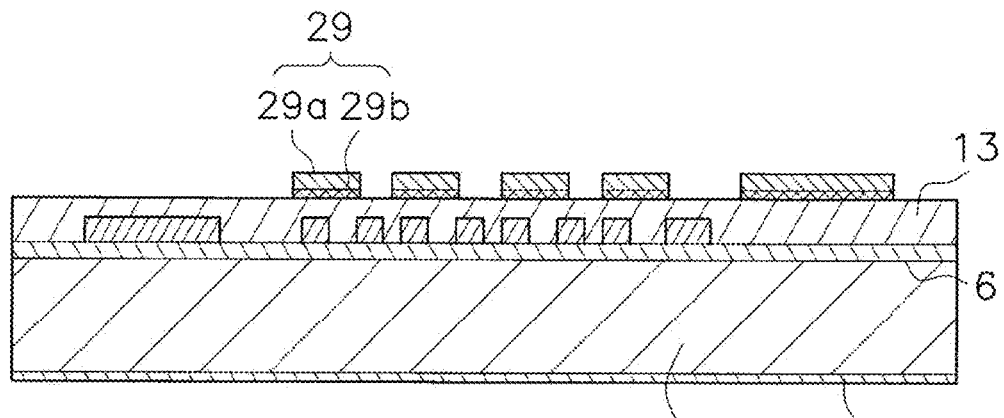
FIG. 12 is a cross-sectional view illustrating a manufacturing process of the MEMS gas sensor.

As illustrated in FIG. 12, the electrode wiring solid layer 29A is dry-etched. Dry etching is, for example, plasma etching. Furthermore, the resist 49 is removed. As a result of the above steps, the electrode wiring pattern 29 is obtained.

Figure 13:
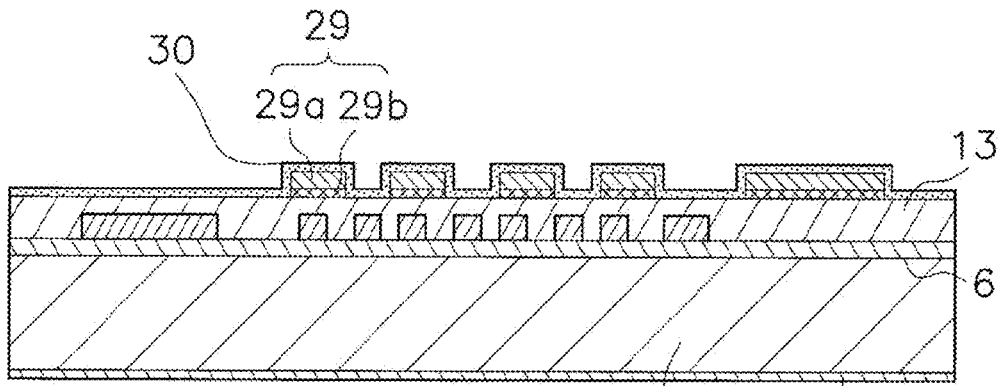
FIG. 13 is a cross-sectional view illustrating a manufacturing process of the MEMS gas sensor.

As illustrated in FIG. 13, the surface protective film 30 is formed on the electrode wiring pattern 29.

Figure 14:
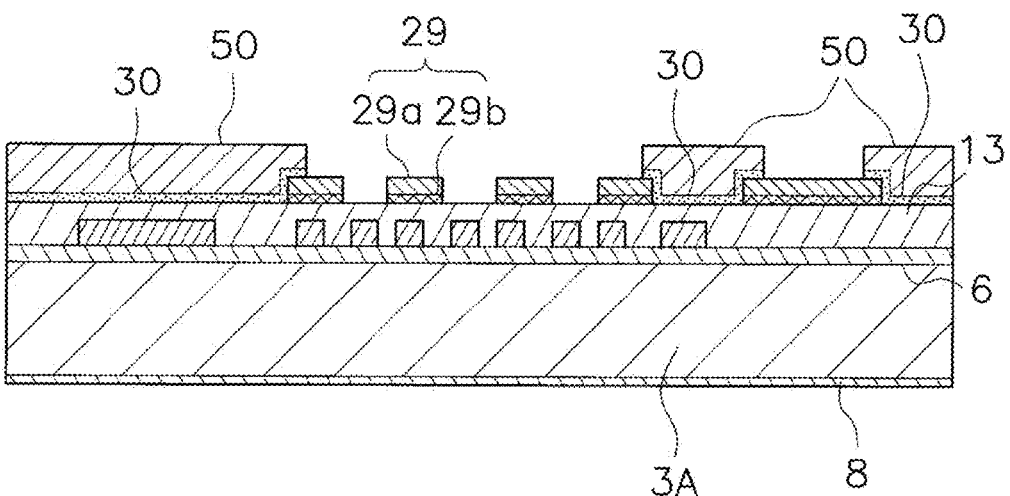
FIG. 14 is a cross-sectional view illustrating a manufacturing process of the MEMS gas sensor.

As illustrated in FIG. 14, a resist 50 in a predetermined pattern is formed on portions other than of a sense pad opening 43 of the surface protective film 30 and a gas sensitive forming portion opening. Thereafter, exposed portions of the surface protective film 30 are removed. The resist 50 is also removed.

Figure 15:
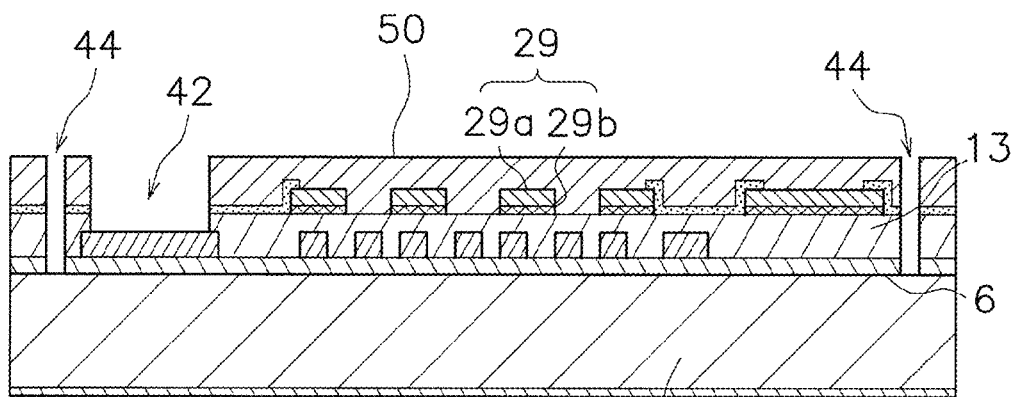
FIG. 15 is a cross-sectional view illustrating a manufacturing process of the MEMS gas sensor.

As illustrated in FIG. 15, a new resist 50 covers portions other than a heater pad opening 42 and dicing line openings 44, and the heater pad opening 42 and the dicing line openings 44 are formed by etching.

Figure 16:
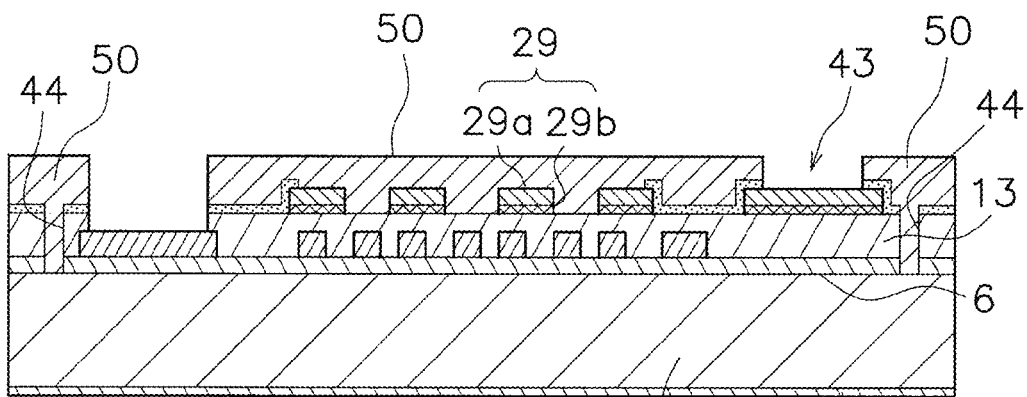
FIG. 16 is a cross-sectional view illustrating a manufacturing process of the MEMS gas sensor.

As illustrated in FIG. 16, the resist 50 is filled in the dicing line openings 44. Additionally, the sense pad opening 43 is formed.

Figure 17:
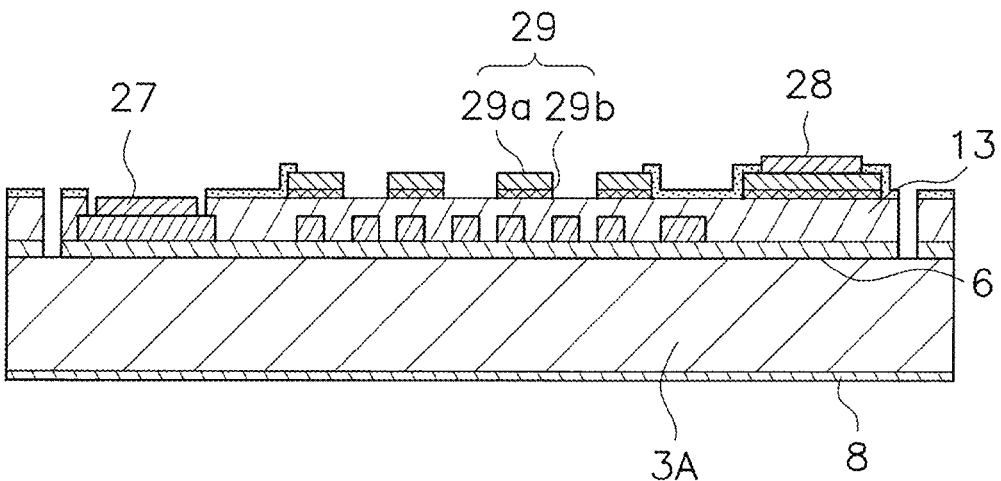
FIG. 17 is a cross-sectional view illustrating a manufacturing process of the MEMS gas sensor.

As illustrated in FIG. 17, the heater electrode pads 27 and the detection electrode pads 28 are formed by lift-off. Thereafter, the resist 50 is removed.

Figure 18:
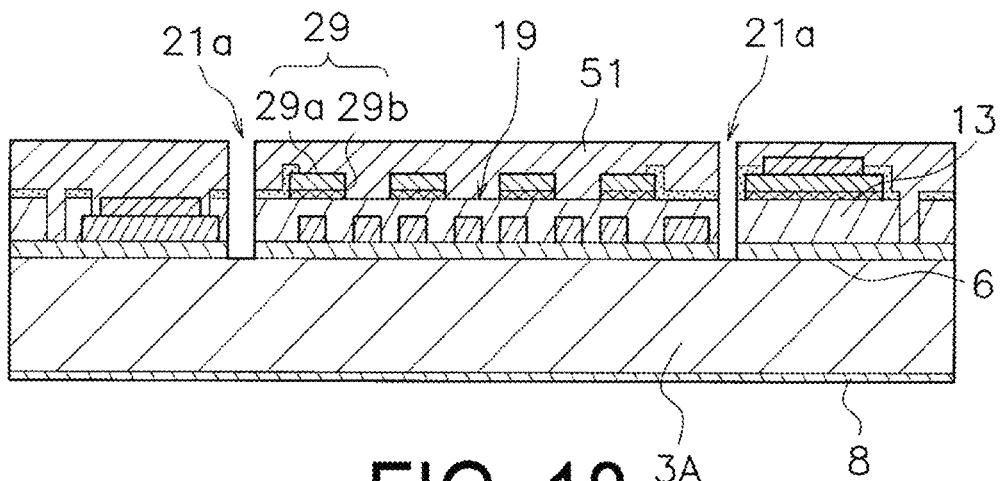
FIG. 18 is a cross-sectional view illustrating a manufacturing process of the MEMS gas sensor.

As illustrated in FIG. 18, a resist 51 is formed. Further, an insulating film opening of the cavity 3c is formed. In other words, the cutouts 21a between the connecting portions 21 are formed. As a result, the central portion 19 is also formed.

Figure 19:
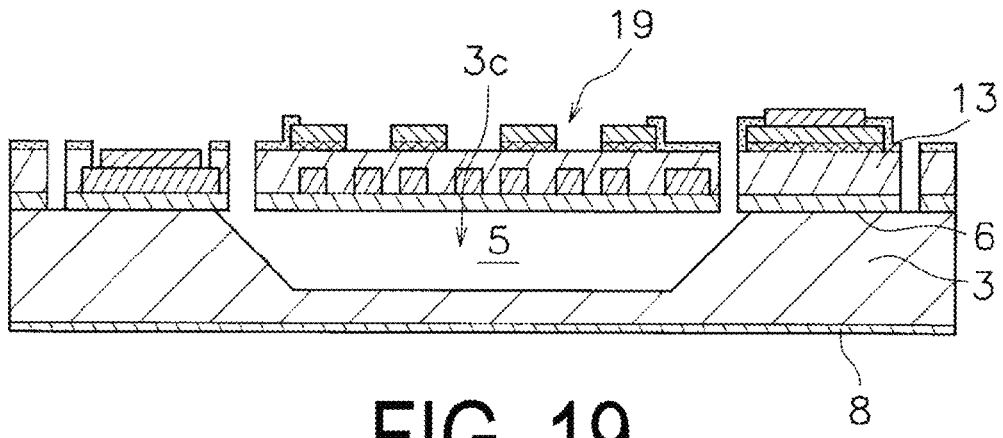
FIG. 19 is a cross-sectional view illustrating a manufacturing process of the MEMS gas sensor.

As illustrated in FIG. 19, the resist 51 is removed.

In addition, the cavity 3c is formed in the wafer 3A. Specifically, anisotropic etching is performed to form the cavity 3c having the opening 5.

Figure 20:
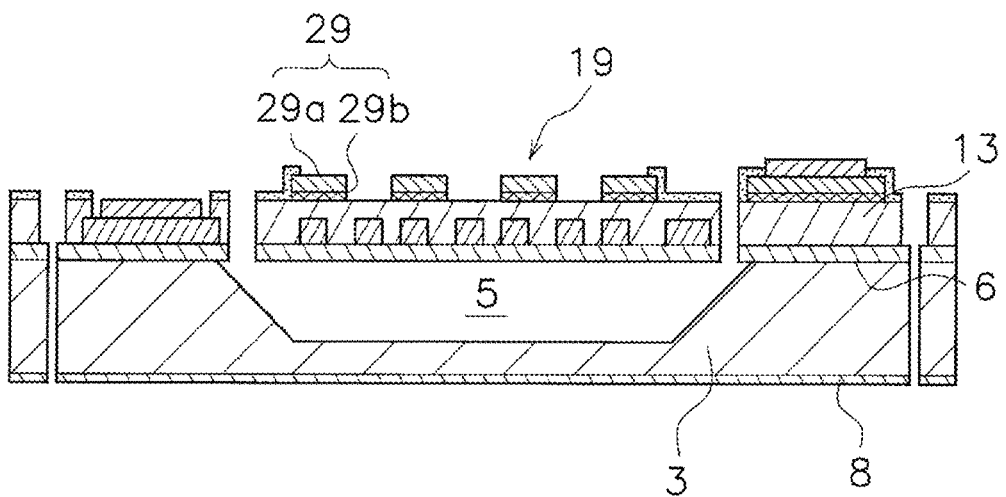
FIG. 20 is a cross-sectional view illustrating a manufacturing process of the MEMS gas sensor.

As illustrated in FIG. 20, dicing is performed on the wafer 3A to obtain the base 3.

Finally, as illustrated in FIG. 3, the gas sensitive material 33 is formed. The gas sensitive material 33 is formed on the detection electrode portion 31 of the central portion 19. In other words, the gas sensitive material 33 is formed on the surface of the central portion 19 so as to cover the detection electrode portion 31. As an example, the gas sensitive material 33 is formed by applying a metal compound semiconductor mainly containing $In_2O_3$ and made into a paste to the surface of the central portion 19 and baking the surface at 650° C. or higher.

As a result, the gas sensor 1 is obtained.

Note that the gas sensitive material 33 may be formed before dicing.

2. Second Embodiment

In the first embodiment, the bridge shape of the four connecting portions 21 is an X-shape but may be another shape.

Figure 22:
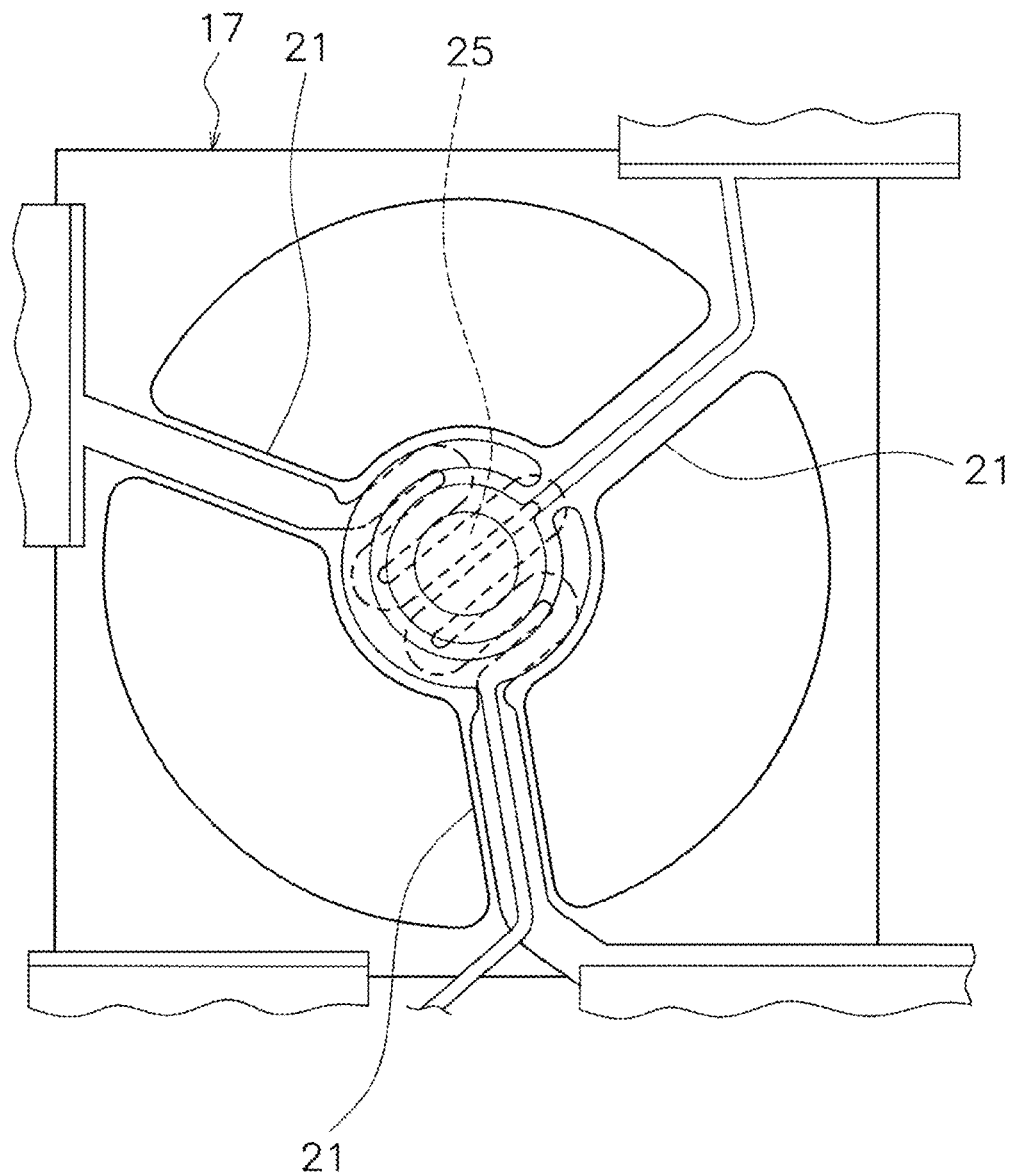
FIG. 22 is a plan view of a transverse cross-section in a portion of the MEMS gas sensor as a second embodiment.
Figure 23:
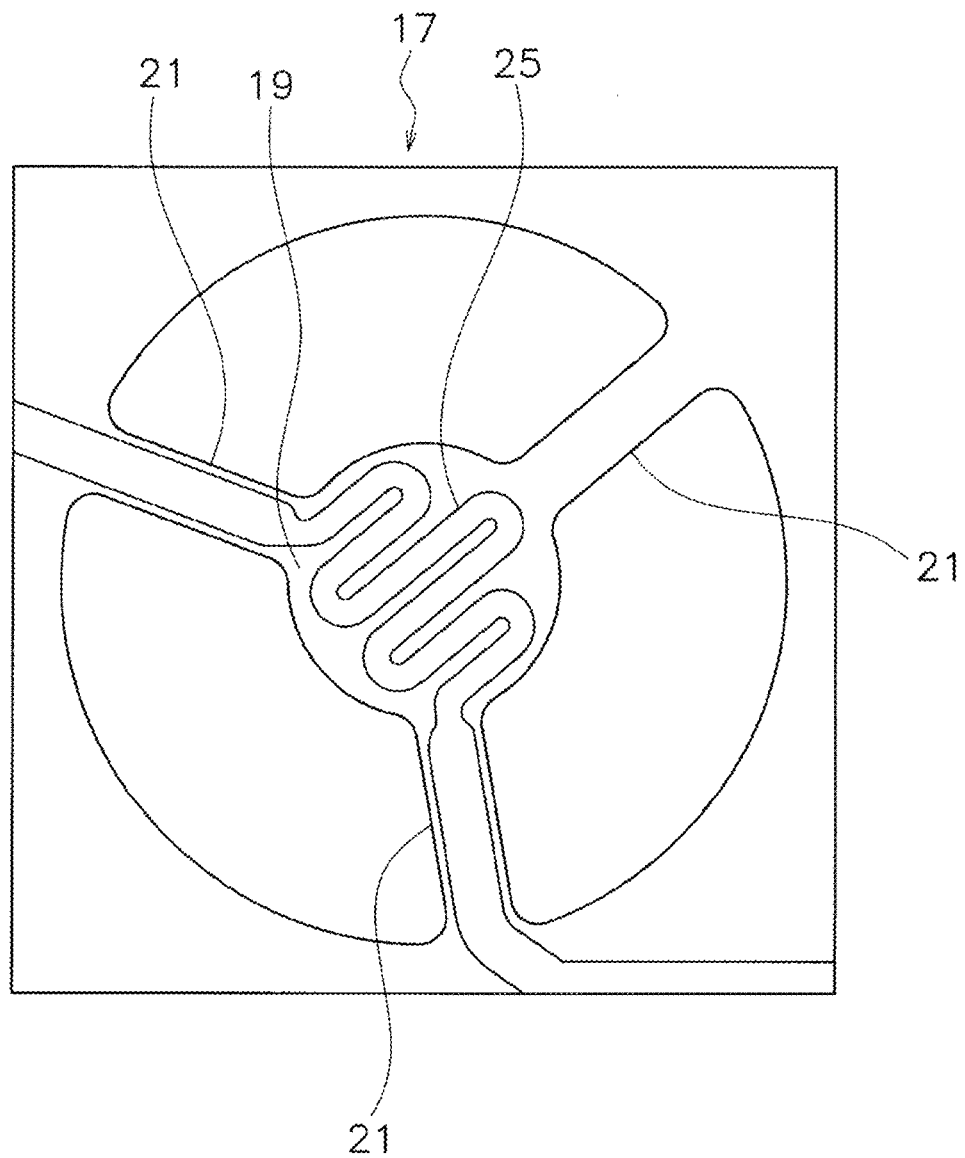
FIG. 23 is a plan view of a heater wiring pattern.

Such an embodiment will be described with use of FIGS. 22 and 23. FIG. 22 is a plan view of a transverse cross-section in a portion of the MEMS gas sensor as a second embodiment. FIG. 23 is a plan view of a heater wiring pattern. Note that the basic configuration is the same as that of the first embodiment and thus differences will be mainly described below.

The number of connecting portions 21 is three connecting portions. The three connecting portions 21 radially extend in a straight line and are precisely three straight types.

In addition, the electric heater unit 25 is in a zigzag pattern.

3. Third to Sixth Embodiments

In the first embodiment and the second embodiment, the electric heater unit 25 of the heater wiring pattern 23 is in a zigzag pattern but may have another shape. Embodiments in which the electric heater unit 25 according to third to sixth embodiments has another shape will be described below. Note that the basic configuration is the same as that of the first embodiment and thus differences will be mainly described below.

Third Embodiment

Figure 24:
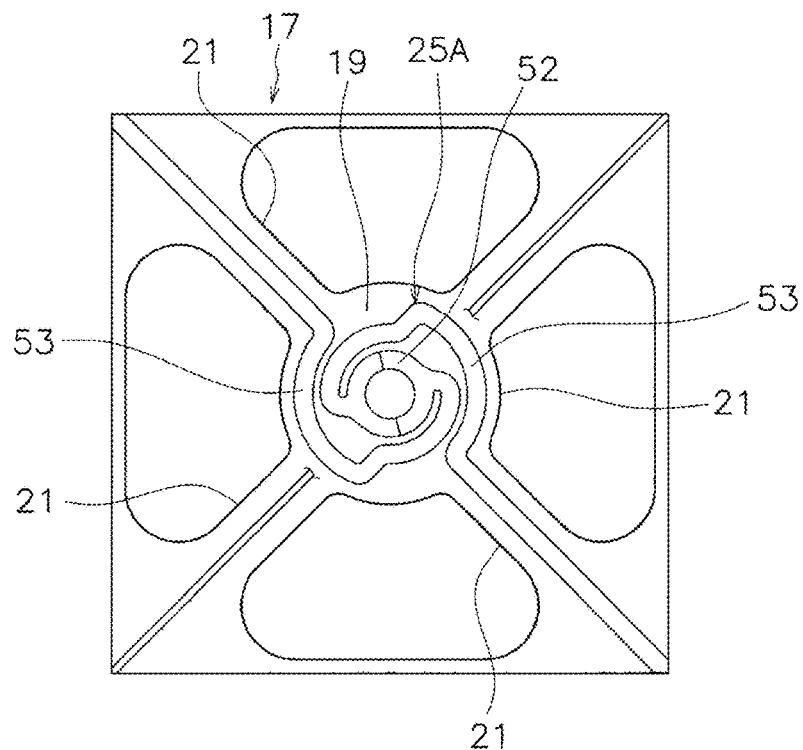
FIG. 24 is a plan view of a heater wiring pattern according to a third embodiment.

The third embodiment will be described with use of FIG. 24. FIG. 24 is a plan view of a heater wiring pattern according to the third embodiment.

An electric heater unit 25A corresponds to the central portion 19 of the bridge portion 17 and includes the annular portion 52. Specifically, the annular portion 52 is configured such that connecting portions 53 (described below) respectively branch at the central portion to be connected in an annular shape. As just described, the center portion of the electric heater unit 25A is not formed. Therefore, the difference in temperature between the center side and the outer circumferential side of the electric heater unit 25A is reduced. As a result, the heater lifespan is extended, and sensor characteristics also become stable.

The electric heater unit 25A includes a pair of the connecting portions 53 extending circumferentially, for example, about 250 degrees in the central portion 19 of the bridge portion 17. One end of each of the connecting portions 53 is connected to the annular portion 52. The pair of connecting portions 53 are arranged so as to have a triple circle around the annular portion 52.

Note that the electric heater unit 25A is made of, for example, NiCr and has a line width larger than that of an electric heater unit made of, for example, Pt.

Fourth Embodiment

Figure 25:
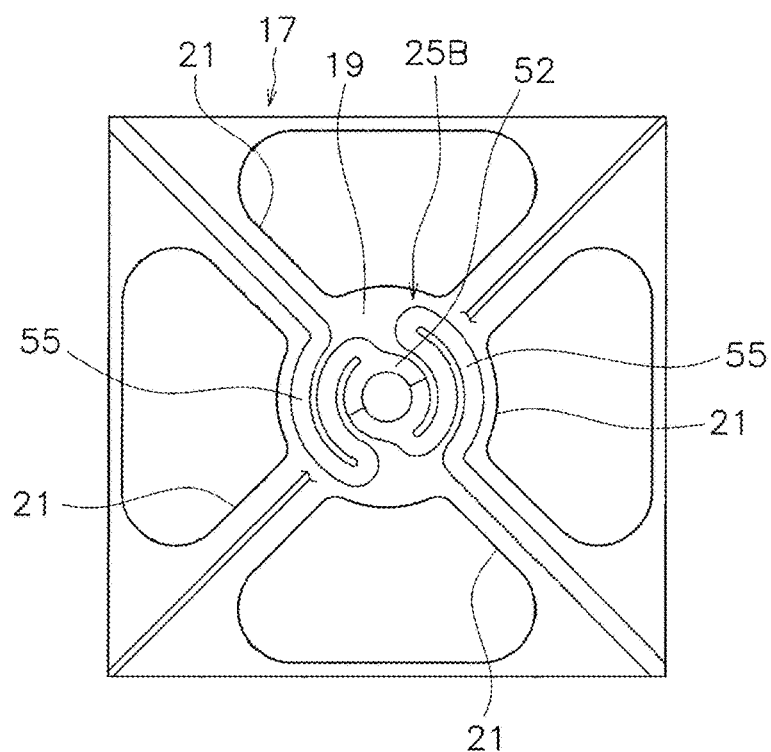
FIG. 25 is a plan view of a heater wiring pattern according to a fourth embodiment.

The fourth embodiment will be described with use of FIG. 25. FIG. 25 is a plan view of a heater wiring pattern according to the fourth embodiment.

An electric heater unit 25B corresponds to the center of the central portion 19 of the bridge portion 17 and includes the annular portion 52. Specifically, the annular portion 52 is formed in a continuous annular shape of a pair of parallel lines respectively extending from connecting portions 55 (described below). As just described, the center portion of the electric heater unit 25B is not formed. Therefore, the difference in temperature between the center side and the outer circumferential side of the electric heater unit 25B is reduced. As a result, the heater lifespan is extended, and sensor characteristics also become stable.

The electric heater unit 25B includes a pair of the connecting portions 55 extending circumferentially in the central portion 19 of the bridge portion 17 to be folded back and further extend. As just described, the connecting portions 55 are folded back and thus are densely disposed at the outer circumferential side of the electric heater unit 25B. One end of each of the connecting portions 55 is connected to the annular portion 52.

Note that the electric heater unit 25B is made of, for example, NiCr and has a line width larger than that of an electric heater unit made of, for example, Pt.

Fifth Embodiment

Figure 26:
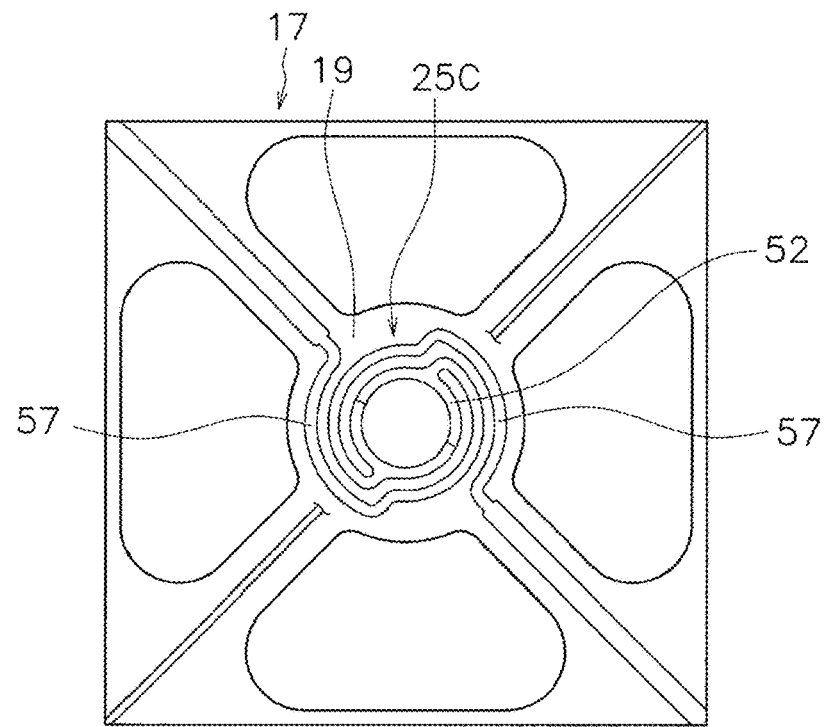
FIG. 26 is a plan view of a heater wiring pattern according to a fifth embodiment.

The fifth embodiment will be described with use of FIG. 26. FIG. 26 is a plan view of a heater wiring pattern according to the fifth embodiment.

An electric heater unit 25C corresponds to the center of the central portion 19 of the bridge portion 17 and includes the annular portion 52 in a plan view. Specifically, the annular portion 52 is formed in a continuous annular shape of a pair of parallel lines respectively extending from connecting portions 57 (described below). As just described, the center portion of the electric heater unit 25C is not formed. Therefore, the difference in temperature between the center side and the outer circumferential side of the electric heater unit 25C is reduced. As a result, the heater lifespan is extended, and sensor characteristics also become stable.

The electric heater unit 25C includes a pair of the connecting portions 57 extending circumferentially, for example, about 290 degrees in the central portion 19 of the bridge portion 17. One end of each of the connecting portions 57 is connected to the annular portion 52.

Note that the electric heater unit 25C is made of, for example, Pt and has a line width smaller than that of an electric heater unit made of, for example, NiCr.

Sixth Embodiment

Figure 27:
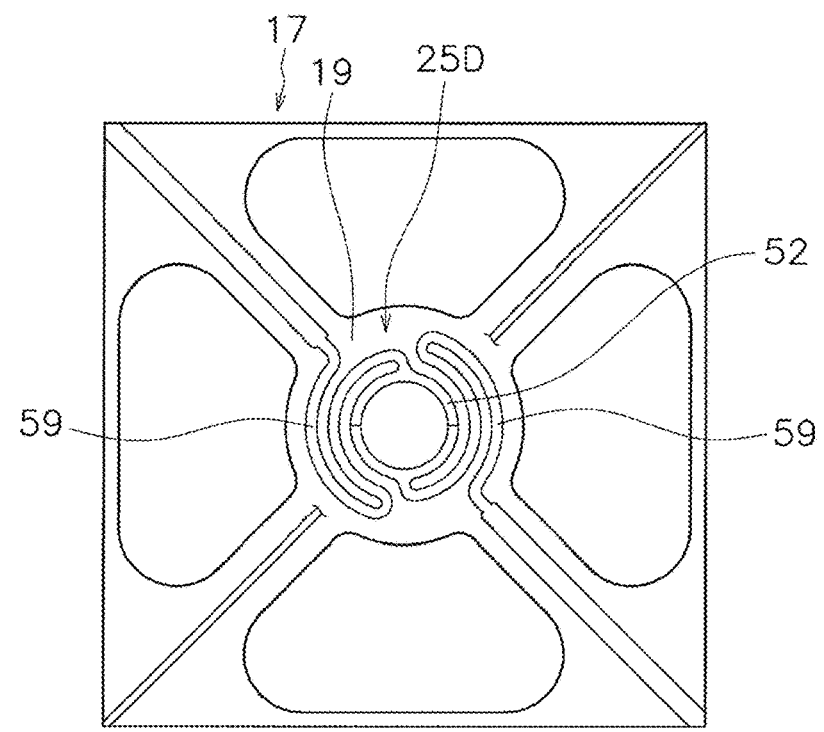
FIG. 27 is a plan view of a heater wiring pattern according to a sixth embodiment.

The sixth embodiment will be described with use of FIG. 27. FIG. 27 is a plan view of a heater wiring pattern according to the sixth embodiment.

An electric heater unit 25D corresponds to the center of the central portion 19 of the bridge portion 17 and includes the annular portion 52 in a plan view. Specifically, the annular portion 52 is formed in a continuous annular shape of a pair of parallel lines respectively extending from connecting portions 59 (described below). As just described, the center portion of the electric heater unit 25D is not formed. Therefore, the difference in temperature between the center side and the outer circumferential side of the electric heater unit 25D is reduced. As a result, the heater life extends, and sensor characteristics also become stable.

The electric heater unit 25D includes a pair of the connecting portions 59 extending circumferentially in the central portion 19 of the bridge portion 17 to be folded back and further extend. As just described, the connecting portions 59 are folded back and thus are densely disposed at the outer circumferential side of the electric heater unit 25D. One end of each of the connecting portions 59 is connected to the annular portion 52.

Note that the electric heater unit 25D is made of, for example, Pt and has a line width smaller than that of an electric heater unit made of, for example, NiCr.

4. Common Matters of Embodiments

The MEMS gas sensor 1 includes an insulator (for example, the base 3), a gas sensitive material (for example, the gas sensitive material 33), a first protective film (for example, the first oxide film 6) and a second protective film (for example, the interlayer insulating film 13), heater wiring (for example, the heater wiring pattern 23), and a gas barrier layer (for example, the lower protective film 11, the upper protective film 20).

The insulator includes a cavity (for example, the cavity 3c).

The gas sensitive material is provided corresponding to the cavity.

The first protective film and the second protective film are provided on the insulator and are disposed so as to overlap in a plan view.

The heater wiring serves to heat the gas sensitive material and is disposed between the first protective film and the second protective film.

The gas barrier layer covers, in direct contact, both surfaces (for example, the upper surface 23c, the lower surface 23d) and a side surface (for example, the side surface 23e) of the heater wiring.

In such a sensor, both the surfaces and the side surface of the heater wiring are covered by the gas barrier layer, and thus a change in a resistance value of a heater can be reduced. Therefore, the lifespan can be increased. The reason for this is that, even when gas barrier properties of the first protective film and the second protective film are low or even when gas components such as hydrogen or oxygen inside the first protective film and the second protective film move to the outside, the gas barrier layer restricts the movement of gas and thus the heater wiring is not influenced by the gas.

5. Other Embodiments

Although the plurality of embodiments of the present disclosure have been described as above, the present disclosure is not limited to the above-described embodiments, and various modifications are possible without departing from the gist of the invention. In particular, the plurality of embodiments and modifications described herein can be combined arbitrarily with one another as necessary.

In the third to sixth embodiments, the annular portion of the electric heater unit is formed in an end portion-less annular shape of a pair of parallel lines extending respectively from the connecting portions. However, the annular portion may include both end portions located close to each other, and may be formed such that one of the end portions extends from one of the connecting portions and the other of the end portions extends from the other of the connecting portions.

The cavity may have an opening at the lower side.

The gas sensitive material, the heater wiring pattern, and the like may be provided on the second main surface of the insulating material.

INDUSTRIAL APPLICABILITY

The present disclosure is broadly applicable to a MEMS gas sensor and a method for manufacturing the same.

BRIEF DESCRIPTION OF THE REFERENCE CHARACTERS

1: MEMS gas sensor
3: Base
3c: Cavity
5: Opening
11: Lower protective film
13: Interlayer insulating film
20: Upper protective film
23: Heater wiring pattern
23a: Heater layer
23c: Upper surface
23d: Lower surface
23e: Side surface
25: Electric heater unit
27: Heater electrode pad
28: Detection electrode pad
29: Electrode wiring pattern
31: Detection electrode portion
33: Gas sensitive material

The invention claimed is:

1. A MEMS gas sensor, comprising:
an insulator including a cavity;
a gas sensitive material provided corresponding to the cavity;
a first protective film formed on the insulator;
heater wiring formed on the first protective film and configured to heat the gas sensitive material;
a lower protective film covering, in direct contact, a lower surface of the heater wiring to restrict movement of gas;
an upper protective film covering, in direct contact, an upper surface and a side surface of the heater wiring and having a substantially constant thickness and a top surface formed in an uneven shape conforming to a shape of the heater wiring, the upper protective film restricting movement of the gas; and
a second protective film formed on the upper protective film.

2. The MEMS gas sensor according to claim 1, wherein at least a portion of the side surface of the heater wiring is an inclined surface.

3. The MEMS gas sensor according to claim 2, wherein the first protective film and the second protective film are made of $SiO_2$.

4. The MEMS gas sensor according to claim 3, wherein the heater wiring is made of NiCr.

5. The MEMS gas sensor according to claim 4, wherein the upper protective film and the lower protective film are made of a metal oxide.

6. The MEMS gas sensor according to claim 3, wherein the upper protective film and the lower protective film are made of a metal oxide.

7. The MEMS gas sensor according to claim 2, wherein the heater wiring is made of NiCr.

8. The MEMS gas sensor according to claim 7, wherein the upper protective film and the lower protective film are made of a metal oxide.

9. The MEMS gas sensor according to claim 2, wherein the upper protective film and the lower protective film are made of a metal oxide.

10. The MEMS gas sensor according to claim 1, wherein the first protective film and the second protective film are made of $SiO_2$.

11. The MEMS gas sensor according to claim 10, wherein the heater wiring is made of NiCr.

12. The MEMS gas sensor according to claim 11, wherein the upper protective film and the lower protective film are made of a metal oxide.

13. The MEMS gas sensor according to claim 10, wherein the upper protective film and the lower protective film are made of a metal oxide.

14. The MEMS gas sensor according to claim 1, wherein the heater wiring is made of NiCr.

15. The MEMS gas sensor according to claim 14, wherein the upper protective film and the lower protective film are made of a metal oxide.

16. The MEMS gas sensor according to claim 1, wherein the upper protective film and the lower protective film are made of a metal oxide.

17. The MEMS gas sensor according to claim 16, wherein the upper protective film and the lower protective film are made of $Ta_2O_5$.

18. The MEMS gas sensor according to claim 1, wherein the heater wiring is formed in an annular shape in a plan view at a location corresponding to the gas sensitive material.

19. A method for manufacturing a MEMS gas sensor, comprising:
    forming a first protective film on an insulator including a cavity;
    forming, on the first protective film, a lower protective film restricting movement of gas;
    forming heater wiring on the lower protective film such that a lower surface of the heater wiring is covered in direct contact by the lower protective film;
    forming an upper protective film restricting movement of the gas, the upper protective film covering, in direct contact, an upper surface and a side surface of the heater wiring and having a substantially constant thickness and a top surface formed in an uneven shape conforming to a shape of the heater wiring;
    forming a second protective film on the upper protective film; and
    forming a gas sensitive material to be provided corresponding to the cavity of the insulator, the gas sensitive material configured to be heated by the heater wiring.

20. The method for manufacturing a MEMS gas sensor according to claim 19, further comprising processing at least a portion of the side surface of the heater wiring into an inclined surface.

* * * * *